United States Patent
Anderson et al.

(10) Patent No.: US 12,075,718 B2
(45) Date of Patent: Sep. 3, 2024

(54) SYSTEM AND METHOD FOR CONTROLLING THE OPERATION OF A ROW CLEANING DEVICE OF A SEED-PLANTING IMPLEMENT

(71) Applicant: CNH Industrial America LLC, New Holland, PA (US)

(72) Inventors: Brian J. Anderson, Yorkville, IL (US); Trevor Stanhope, Oak Lawn, IL (US)

(73) Assignee: CNH Industrial America LLC, New Holland, PA (US)

( * ) Notice: Subject to any disclaimer, the term of this patent is extended or adjusted under 35 U.S.C. 154(b) by 831 days.

(21) Appl. No.: 17/177,506

(22) Filed: Feb. 17, 2021

(65) Prior Publication Data

US 2022/0256763 A1    Aug. 18, 2022

(51) Int. Cl.
| | | |
|---|---|---|
| A01B 76/00 | (2006.01) | |
| A01B 63/00 | (2006.01) | |
| A01C 7/08 | (2006.01) | |
| G05B 15/02 | (2006.01) | |

(52) U.S. Cl.
CPC ............ *A01B 76/00* (2013.01); *A01B 63/008* (2013.01); *G05B 15/02* (2013.01); *A01C 7/08* (2013.01)

(58) Field of Classification Search
CPC ..... A01B 76/00; A01B 63/008; A01B 63/002; A01B 63/00; A01C 7/08; A01C 7/00; G05B 15/02; G05B 15/00
See application file for complete search history.

(56) References Cited

U.S. PATENT DOCUMENTS

| | | |
|---|---|---|
| 8,522,889 B2 | 9/2013 | Adams et al. |
| 9,282,688 B2 | 3/2016 | Casper et al. |
| 10,165,725 B2 | 1/2019 | Sugumaran et al. |
| 10,255,670 B1 | 4/2019 | Wu |
| 10,262,206 B2 | 4/2019 | Posselius |
| 10,440,877 B2 | 10/2019 | Zemenchik |
| 10,492,353 B2 | 12/2019 | Kovach et al. |
| 2017/0049044 A1 | 2/2017 | Stoller et al. |
| 2017/0112043 A1 | 4/2017 | Nair et al. |
| 2018/0168094 A1 | 6/2018 | Koch et al. |
| 2018/0310469 A1 | 11/2018 | Henry et al. |
| 2019/0297769 A1 | 10/2019 | Zielke et al. |
| 2019/0387658 A1 | 12/2019 | Henry |
| 2019/0392263 A1 | 12/2019 | Ferrari et al. |

FOREIGN PATENT DOCUMENTS

| | | |
|---|---|---|
| WO | WO 2017/197274 | 11/2017 |
| WO | WO 2019/040518 | 2/2019 |
| WO | WO 2019/079205 | 4/2019 |
| WO | WO 2020/039322 | 2/2020 |

*Primary Examiner* — Christopher J. Novosad
(74) *Attorney, Agent, or Firm* — Rebecca Henkel; Peter K. Zacharias; Rickard K. DeMille

(57) ABSTRACT

A system for controlling the operation of a row cleaning device of a seed-planting implement may include a row cleaning device configured to adjust a surface cleanliness of a portion of a field, at least one row sensor, and a controller. The at least one row sensor may generate data indicative of a first surface cleanliness parameter within a worked area of the field positioned aft of the row cleaning device and a second surface cleanliness parameter within an unworked area of the field, the unworked area being outside of the worked area. The controller may be configured to receive the data indicative of the first and second surface cleanliness parameters from the at least one row sensor, and to determine an efficiency of the row cleaning device based at least in part on the first and second surface cleanliness parameters.

20 Claims, 5 Drawing Sheets

SYSTEM AND METHOD FOR CONTROLLING THE OPERATION OF A ROW CLEANING DEVICE OF A SEED-PLANTING IMPLEMENT

FIELD OF THE INVENTION

The present disclosure relates generally to agricultural implements and, more particularly, to systems and methods for automatically controlling the operation of a row cleaning device of a seed-planting implement.

BACKGROUND OF THE INVENTION

Modern farming practices strive to increase yields of agricultural fields. In this respect, certain agricultural implements, such as seed-planting implements, are towed behind a tractor or other work vehicle for planting. A seed-planting implement typically includes one or more ground engaging assemblies configured to work the soil as the implement is moved across a field. For example, in certain configurations, the implement may include one or more row cleaning devices that move residue and break up or sweep away clods from the path of subsequent ground engaging assemblies, such as one or more opening assemblies that form a trench or furrow within the soil for receiving seeds as the implement is moved across the field. Furthermore, the implement may also include one or more closing assemblies that close the furrow over seeds while the implement is moved across the field. In this regard, the function(s) of the ground engaging tool(s) requires or relies upon movement of the field materials, such as soil, crop residue, and/or clods, relative to the assemblies.

Typically, the ground engaging assemblies are configured to work the soil in a specific way. For example, when the row cleaning devices are operating with the correct amount of down pressure, there is little to no residue left behind the row cleaning device and very little soil is moved by the row cleaning device. However, if the row cleaning devices are operated with too little down pressure, too much residue and/or clods are left behind, which can negatively affect yields. Similarly, if the row cleaning devices are operated with too much down pressure, a significant amount of soil is removed from the travel path of the subsequent ground engaging assemblies, which can also negatively affect yields.

Accordingly, an improved system and method for automatically controlling the operation of a row cleaning device of a seed-planting implement would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for controlling the operation of a row cleaning device of a seed-planting implement. The system includes a row cleaning device configured to adjust a surface cleanliness of a portion of a field aligned with a travel path of a component of a seed-planting implement as the seed-planting implement moves across the field, where the component is positioned aft of the row cleaning device along a direction of travel of the seed-planting implement. The system further includes at least one row sensor configured to generate data indicative of a first surface cleanliness parameter within a worked area of the field positioned aft of the row cleaning device and a second surface cleanliness parameter within an unworked area of the field. The worked area includes at least a portion of the travel path of the component and the unworked area is outside of the worked area. Additionally, the system includes a controller communicatively coupled to the at least one row sensor, where the controller has a processor and a memory. The memory is configured to store instructions that, when executed by the processor, configure the controller to receive the data indicative of the first and second surface cleanliness parameters from the at least one row sensor, and determine an efficiency of the row cleaning device based at least in part on the first and second surface cleanliness parameters.

In another aspect, the present subject matter is directed to a method for controlling the operation of a row cleaning device of a seed-planting implement, where the row cleaning device is configured to adjust a surface cleanliness of a portion of a field aligned with a travel path of a component of a seed-planting implement as the seed-planting implement moves across the field, with the component being aft of the row cleaning device along a direction of travel of the seed-planting implement. The method includes receiving, with one or more computing devices, data from at least one row sensor as the seed planting implement moves across the field, the data being indicative of a first surface cleanliness parameter within a worked area of the field positioned aft of the row cleaning device and a second surface cleanliness parameter within an unworked area of the field. The worked area includes at least a portion of the travel path of the component and the unworked area is outside of the worked area. The method further includes determining, with the one or more computing devices, an efficiency of the row cleaning device based at least in part on the first and second surface cleanliness parameters. Additionally, the method includes automatically adjusting, with the one or more computing devices, an operation of the row cleaning device based at least in part on the determined efficiency of the row cleaning device.

In a further aspect, the present subject matter is directed to a system for controlling the operation of a row cleaning device of a seed-planting implement. The system includes a row cleaning device configured to move field materials away from a travel path of a component of a seed-planting implement as the seed-planting implement moves across a field, where the component is positioned aft of the row cleaning device along a direction of travel of the seed-planting implement. The system further includes at least one row sensor configured to generate data indicative of a composition of field materials moved by the row cleaning device. Additionally, the system includes a controller communicatively coupled to the at least one row sensor, where the controller includes a processor and a memory. The memory is configured to store instructions that, when executed by the processor, configure the controller to receive the data from the at least one row sensor as the seed planting implement moves across the field, and monitor the composition of the field materials moved by the row cleaning device based at least in part on the data received from the at least one row sensor.

In an additional aspect, the present subject matter is directed to a method for controlling the operation of a row cleaning device of a seed-planting implement, the row cleaning device being configured to move field materials away from a travel path of a component of a seed-planting implement as the seed-planting implement moves across a field, the component being positioned aft of the row cleaning device along a direction of travel of the seed-planting implement. The method includes receiving, with one or more computing devices, data from at least one row sensor as the seed planting implement moves across the field, the data being indicative of a composition of field materials moved by the row cleaning device. The method further includes monitoring, with the one or more computing devices, the composition of the field materials moved by the row cleaning device based at least in part on the data received from the at least one row sensor. Additionally, the method includes automatically adjusting, with the one or more computing devices, an operation of the row cleaning device based at least in part on the monitored composition of the field materials moved by the row cleaning device.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
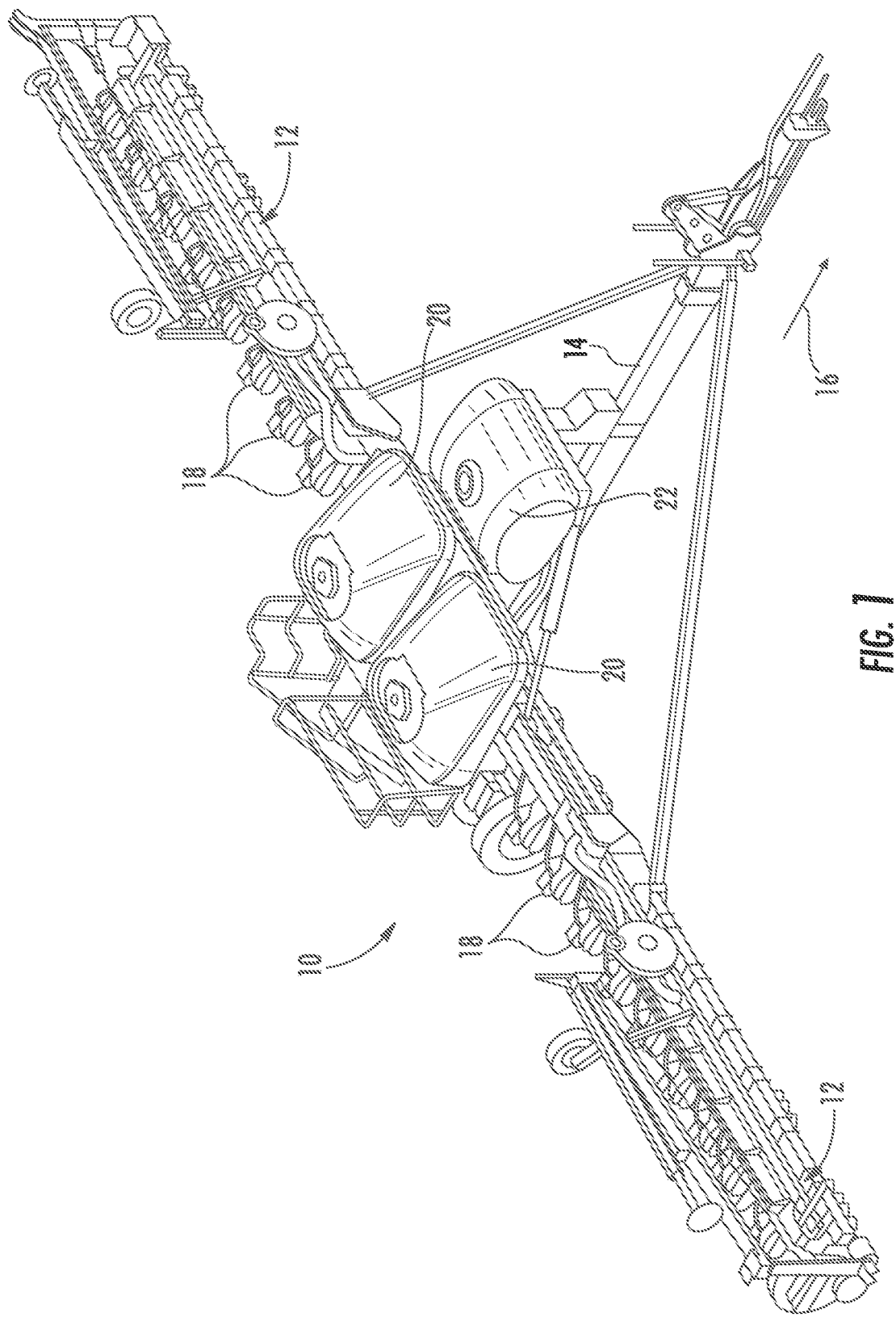
FIG. 1 illustrates a perspective view of one embodiment of a seed-planting implement in accordance with aspects of the present subject matter.

Repeat use of reference characters in the present specification and drawings is intended to represent the same or analogous features or elements of the present technology.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for automatically controlling the operation of a row cleaning device of a seed-planting implement. Specifically, in several embodiments, as a seed-planting implement is moved across a field, one or more row cleaning devices may be configured adjust the surface cleanliness of a travel path of subsequent components of the implement, such as one or more opening devices, seed dispensing tools, closing wheels, etc. (e.g., by moving residue and sweeping and/or breaking up clods). In one embodiment, an efficiency of the row cleaning devices in clearing away such residue and clods may be determined by comparing the surface cleanliness (e.g., residue coverage, the number of clods, and/or the average size of clods) of a portion of the field after being worked by the row cleaning devices to the surface cleanliness of a portion of the field unaffected or unworked by the row cleaning devices. Row cleaning devices with efficiencies that are too low may be automatically adjusted to have an increased down pressure to increase their efficiencies. In some embodiments, the composition (e.g., percentage of soil and/or percentage of residue) of field materials moved by the row cleaning devices may also or alternatively be monitored. If there is too much soil within the materials moved by one or more of the row cleaning devices, such row cleaning devices may be automatically adjusted to have a decreased down pressure to move less soil. Similarly, if there is too little residue within the materials moved by one or more of the row cleaning devices, such row cleaning devices may be automatically adjusted to have an increased down pressure to move more residue. As such, the operation of the row cleaning devices may be automatically adjusted based on the monitored efficiency and/or composition to provide the best performance throughout the entire operation of the implement within the field.

Referring now to the drawings, FIG. 1 illustrates a perspective view of one embodiment of an agricultural implement 10 in accordance with aspects of the present subject matter. It should be appreciated that, although the agricultural implement 10 illustrated herein corresponds to a seed-planting implement or planter, the implement 10 may generally correspond to any suitable equipment or implement having tools configured to engage the soil within a field, such as a tillage implement, a planter, and/or the like.

As shown in FIG. 1, the implement 10 may include a laterally extending toolbar or frame assembly 12 (e.g., including laterally extending, left and right toolbar sections) connected at its middle to a forwardly extending tow bar 14 to allow the implement 10 to be towed by a work vehicle (not shown), such as an agricultural tractor, in a direction of travel (e.g., as indicated by arrow 16 in FIG. 1). The toolbar 12 may generally be configured to support a plurality of seed planting units (or row units) 18. As is generally understood, each row unit 18 may be configured to deposit seeds at a desired depth beneath the soil surface and at a desired seed spacing as the implement 10 is being towed by the work vehicle, thereby establishing rows of planted seeds. In some embodiments, the bulk of the seeds to be planted may be stored in one or more hoppers or seed tanks 20. Thus, as seeds are planted by the row units 18, a pneumatic distribution system may distribute additional seeds from the seed tanks 20 to the individual row units 18. Additionally, one or more fluid tanks 22 may store agricultural fluids, such as insecticides, herbicides, fungicides, fertilizers, and/or the like.

It should be appreciated that, in general, the implement 10 may include any number of row units 18, such as six, eight, twelve, sixteen, twenty-four, thirty-two, or thirty-six row units. In addition, it should be appreciated that the lateral spacing between row units 18 may be selected based on the type of crop being planted. For example, the row units 18 may be spaced approximately thirty inches from one another for planting corn, and approximately fifteen inches from one another for planting soybeans.

It should also be appreciated that the configuration of the seed-planting implement 10 described above and shown in FIG. 1 is provided only to place the present subject matter in an exemplary field of use. Thus, it should be appreciated that the present subject matter may be readily adaptable to any manner of implement configuration. For example, the implement 10 may instead be configured as a tillage implement having one or more ground engaging assemblies capable of experiencing material accumulation, such as one or more tillage assemblies having disc harrows or rolling baskets.

Figure 2:
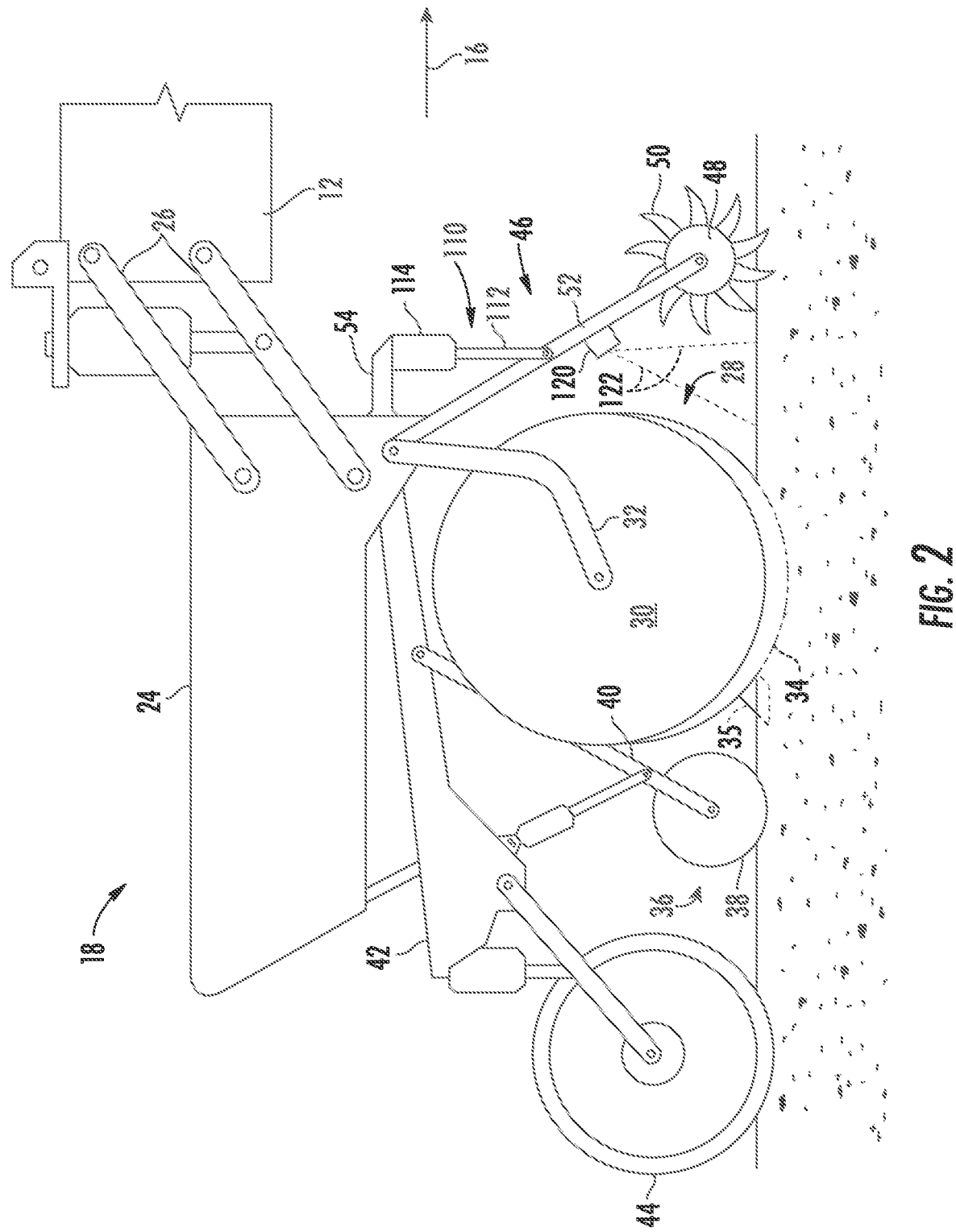
FIG. 2 illustrates a side view of one embodiment of a row unit suitable for use with a seed-planting implement in accordance with aspects of the present subject matter.

Referring now to FIG. 2, a side view of one embodiment of a row unit 18 is illustrated in accordance with aspects of the present subject matter. As shown, the row unit 18 may include a frame 24 adjustably coupled to the toolbar 12 by links 26. For example, one end of each link 26 may be pivotably coupled to the frame 24, while an opposed end of each link 26 may be pivotably coupled to the toolbar 12. In one embodiment, the links 26 may be parallel. However, it should be appreciated that, in alternative embodiments, the row unit 18 may be coupled to the toolbar 12 in any other suitable manner.

As shown in FIG. 2, the row unit 18 also includes a furrow opening assembly 28. For example, in one embodiment, the furrow opening assembly 28 may include a gauge wheel 30 operatively coupled to the frame 24 of the row unit 18 via a support arm 32. Furthermore, the opening assembly 28 may also include disc openers 34 (only one of which is shown) configured to excavate a furrow or trench in the soil. As is generally understood, the gauge wheel 30 may be configured to engage the top surface of the soil as the implement 10 is moved across the field. In this regard, the height of the disc opener(s) 34 may be adjusted with respect to the position of the gauge wheel 30 to set the desired depth of the furrow being excavated. A delivery tube 35 may be configured to deposit seeds, fertilizer, and/or the like in the trench formed by the disc openers 34. In some embodiments, the delivery tube 35 is positioned at least partially between the gauge wheels 30 and/or between the disc openers 34.

Moreover, as shown, the row unit 18 may include a furrow closing assembly 36. Specifically, in several embodiments, the furrow closing assembly 36 may include a pair of closing discs 38 (only one of which is shown) positioned relative to each other in a manner that permits soil to flow between the discs 38 as the implement 10 is being moved across the field. As such, the closing discs 38 may be configured to close the furrow after seeds have been deposited therein, such as by pushing the excavated soil into the furrow. Furthermore, the furrow closing assembly 36 may include a support arm 40 configured to adjustably couple the closing discs 38 to the frame assembly 24. For example, one end of the support arm 40 may be pivotably coupled to the closing discs 38, while an opposed end of the support arm 40 may be pivotably coupled to a chassis arm 42, which is, in turn, coupled to the frame 24. However, it should be appreciated that, in alternative embodiments, the closing discs 38 may be coupled to the frame 24 in any other suitable manner. Furthermore, it should be appreciated that, in alternative embodiments, the furrow closing assembly 36 may include any other suitable number of closing discs 38, such as one closing disc 38 or three or more closing discs 38. Additionally, the furrow closing assembly 36 may include a press wheel 44 configured to roll over the closed furrow to firm the soil over the seed and promote favorable seed-to-soil contact.

Additionally, as shown in FIG. 2, the row unit 18 may include a row cleaning device or row cleaner 46 positioned at the forward end of the row unit 18 relative to the direction of travel 16. In this regard, the row cleaner 46 may be configured to adjust the surface cleanliness of the field. For instance, the row cleaner 46 may break up and/or sweep away residue, dirt clods, and/or the like from the travel path of components aft of the row cleaner 46 (e.g., disc openers 34), such as before the furrow is formed in the soil. For example, in one embodiment, the row cleaner 46 may include a pair of cleaning wheels 48 (only one of which is shown in FIG. 2), with each wheel 48 having a plurality of tillage points or fingers 50. As such, the wheel(s) 48 may be configured to roll relative to the soil as the implement 10 is moved across the field such that the fingers 50 break up and/or sweep away residue and dirt clods. Additionally, the row cleaner 46 may include a support arm 52 configured to adjustably couple the cleaning wheel(s) 48 to the frame assembly 24. For example, one end of the support arm 52 may be pivotably coupled to the wheel(s) 48, while an opposed end of the support arm 52 may be pivotably coupled to the frame 24. However, it should be appreciated that, in alternative embodiments, the cleaning wheel(s) 48 may be coupled to the frame 24 in any other suitable manner. Furthermore, it should be appreciated that, in alternative embodiments, the row cleaner 46 may include any other suitable number of cleaning wheels 48 and/or may be configured in any other suitable manner.

Figure 3:
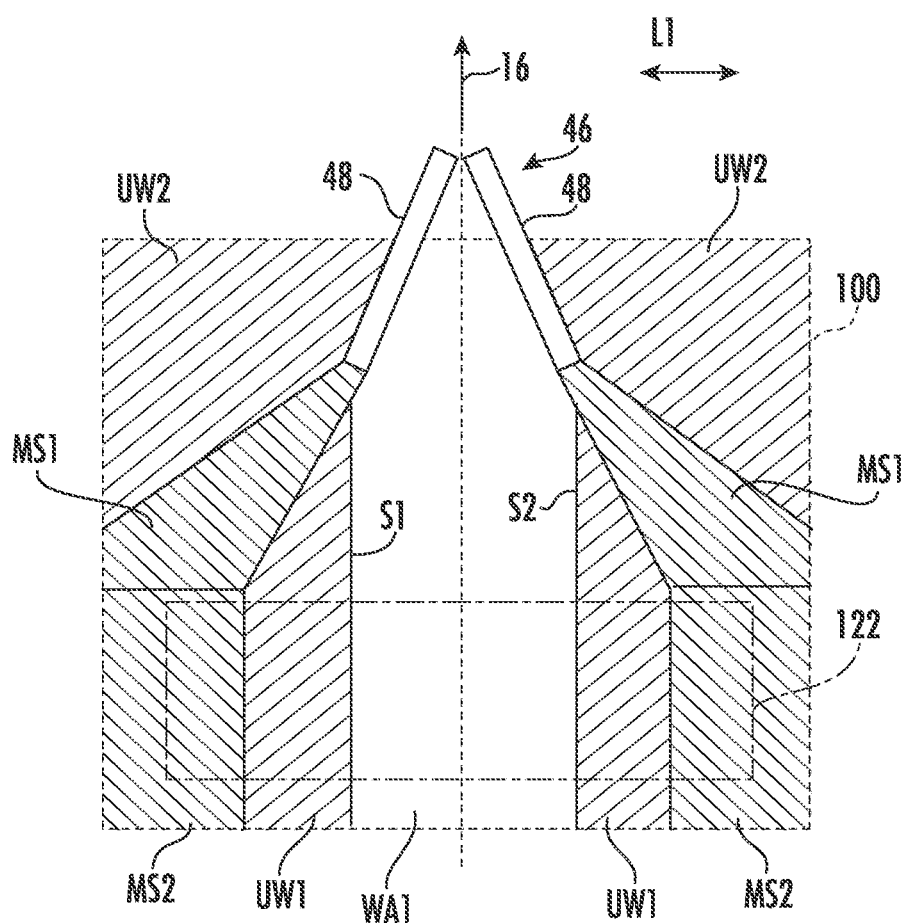
FIG. 3 illustrates a top down view of a portion of the field aft of a row cleaning unit of a seed-planting implement in accordance with aspects of the present subject matter.

Referring briefly to FIG. 3, a top-down view of a portion of a field 100 aft of a row cleaning unit of a seed-planting implement (e.g., the row cleaner 46 shown in FIG. 2) is illustrated in accordance with aspects of the present subject matter. As shown in FIG. 3, as the row cleaner 46 moves along the direction of travel 16 within the field 100, the cleaning wheels 48 break up and/or sweep away residue and dirt clods from a worked area WA1 of the field that is located aft of the row cleaner 46 and is generally aligned with the cleaning wheels 48 in the direction of travel 16. The worked area WA1 extends along a lateral direction L1, generally perpendicular to the direction of travel 16, between a first lateral side S1 and a second lateral side S2. The worked area includes at least a portion of the travel path of another component of the row unit 18 that subsequently works the field. For instance, a trench (not shown) is subsequently formed by the disc openers 34 (FIG. 2) at least partially within the worked area WA1. Field materials (e.g., clods, residue, etc.) moved by the cleaning wheels 48 out of the worked area WA1 form a "bow wave" including flows of field material MS1 that are actively moving away from the worked area WA1 and deposited field materials MS2 that are deposited generally laterally outside of the worked area WA1. For instance, as shown in FIG. 3, the deposited materials MS2 are spaced laterally from the lateral sides S1, S2 of the worked area WA1. The lateral distance or spacing between the deposited materials MS2 and the worked area WA1 generally increases with an increase in ground speed of the implement 10 and decreases with a decrease in ground speed of the implement 10. Portions of the field that are unaffected or not worked by the row cleaner 46 include first unworked areas UW1 and second unworked areas UW2, with the unworked areas UW1, UW2 being defined generally outside of the worked area WA1. More particularly, the first unworked areas UW1 are defined between a respective lateral side S1, S2 of the worked area WA1 and a respective deposited material area MS2 and are rearward of the row cleaner 46 along the direction of travel 16. The second unworked areas UW2 are defined generally laterally outside of the cleaning wheels 48 and forward of the flows of materials MS1 actively moving away from the worked area WA1.

Referring back to FIG. 2, in several embodiments, an actuator 110 may be configured to move or otherwise adjust the position of the row cleaner 46 relative to the frame 24. For example, as shown in the illustrated embodiment, a first end of the actuator 110 (e.g., a rod 112 of the actuator 110) may be coupled to the support arm 52 of the row cleaner 46, while a second end of the actuator 110 (e.g., the cylinder 114 of the actuator 110) may be coupled to a bracket 54, which is, in turn, coupled to the frame 24. The rod 112 of the actuator 110 may be configured to extend and/or retract relative to the cylinder 114 to adjust the downforce being applied to the cleaning wheel(s) 48. As such, increasing the downforce being applied to the cleaning wheel(s) 48 may increase the aggressiveness with which the cleaning wheel (s) 48 breaks up and sweeps away the residue and/or dirt clods. Conversely, decreasing the downforce being applied to the cleaning wheel(s) 48 may decrease the aggressiveness with which the cleaning wheel(s) 48 breaks up and sweeps away the residue and/or dirt clods. In the illustrated embodiment, the actuator 110 corresponds to a cylinder, such as hydraulic or pneumatic cylinder. However, it should be appreciated that the actuator 110 may correspond to any other suitable type of actuator, such as an electric linear actuator.

In one embodiment, one or more row sensors 120 may additionally be provided in operative association with the row unit 18. Specifically, in several embodiments, each row sensor 120 may be configured to capture data indicative of the amount of residue, the amount of clods, and/or the average size of clods within at least a portion of the field 100 across which the implement 10 is being moved. Alternatively, or additionally, data indicative of the amount of bare or uncovered soil within at least a portion of the field 100 across which the implement 10 is being moved may also be generated by the row sensor(s) 120. For example, in one embodiment, the row sensor 120 may be mounted or installed on the support arm 52 of the row cleaner 46 such that the row sensor 120 has a field of view or sensor detection range (e.g., as indicated by dashed lines 122 in FIGS. 2 and 3) directed towards at least a portion of the field 100 rearward of the row cleaner 46 and forward of the disc openers 34. For instance, as shown in FIG. 3, the field of view 122 includes portions of the worked area WA1, the unworked areas UW1, and the field materials MS2 moved by the row cleaner 46. However, it should be appreciated that the field of view 122 may include any suitable portions of the field 100.

It should further be appreciated that the row sensor 120 may be installed at any other suitable location(s) on the row unit 18 or the implement 10. For example, in one embodiment, the row sensor 120 may be mounted on the row unit 18 such that the row sensor 120 is configured to capture data indicative of the unworked area UW2 of the field 100 in addition, or alternatively, to the unworked area UW1. In some embodiments, the row sensor 120 may be mounted on the row unit 18 such that the field of view 122 of the row sensor 120 is directed aft of the seed-tube 35 and forward of the closing disks 38 along the direction of travel 16.

Further, it should be appreciated that, while only one row sensor 120 is shown as being mounted to the row unit 18 in FIG. 2, any suitable number of row sensors 120 may be mounted to each of the row units 18, such as two, three, four, or more row sensors 120. Moreover, it should be appreciated that the row sensor 120 may correspond to any suitable sensing device(s) configured to generate data (e.g., images, point cloud data, and/or the like) associated with the soil, residue, and/or clods present within the associated field of view. For example, in several embodiments, the row sensor 120 may correspond to a camera(s) (e.g., RGB, multispectral, infrared, thermal, etc.). In some embodiments, the row sensor 120 may correspond to an infrared sensor(s), a radar sensor(s), a Light Detection and Ranging (LIDAR) sensor (s), etc. However, in alternative embodiments, the row sensor 120 may correspond to any other suitable device(s) or combination of devices. Additionally, it should be appreciated that the configuration of the row unit 18 described above and shown in FIG. 2 is provided only to place the present subject matter in an exemplary field of use. Thus, it should be appreciated that the present subject matter may be readily adaptable to any manner of row unit configuration.

As will be described in further detail below, the data received from the row sensor(s) 120 may be used to automatically adjust the operation of the row cleaner(s) 46. For instance, when there is a normal amount of residue or clods or a normal amount of uncovered soil within a portion of the field, the row cleaner 46 may operating efficiently at a "normal" down pressure or depth setting such that there is little to no residue and clods left in the worked area WA1. However, if there is a significant amount of residue or clods or less uncovered soil than normal within a portion of the field, more residue and clods may be left behind than desired, even though the same amount of residue is being removed. Thus, with reference again to FIG. 3, in one embodiment, the field of view 122 of the row sensor(s) 120 includes a portion(s) of both the worked area WA1 and the unworked area(s) UW1, UW2. The row sensor(s) 120 may generate data which may be automatically analyzed in any suitable way (e.g., by using one or more suitable image processing algorithms on images captured by the sensor(s) 120) to determine a surface cleanliness parameter of the worked area WA1 and the unworked area(s) UW1, UW2, where the surface cleanliness parameters are indicative of the amount of residue, the amount of clods, the average size of clods, and/or the amount of uncovered soil within each respective area WA1, UW1, UW2 of the field 100. The surface cleanliness parameter of the worked area WA1 may then be compared to the surface cleanliness parameter of the unworked area(s) UW1, UW2 to determine an efficiency of the row cleaner operation. For instance, the amount of residue, the number and/or size of clods, and/or the amount of uncovered soil within the unworked area(s) UW1, UW2 (e.g., as detected based at least in part on the row sensor(s) 120) may be compared to the amount of residue, the number and/or size of clods, and/or the amount of uncovered soil within the worked area WA1 (e.g., as detected based at least in part on the row sensor(s) 120) to determine an efficiency of the row cleaner 46. For example, in one embodiment, the efficiency of the row cleaner 46 is determined based at least in part on the difference between the amounts of residue, the numbers and/or sizes of clods, and/or the amounts of uncovered soil within the worked and unworked areas WA1, UW1.

If the determined efficiency of the row cleaner 46 is less than an associated efficiency threshold, then the down pressure or depth setting of the row cleaner 46 needs to be adjusted (e.g., increased).

Similarly, when the row cleaner 46 is operating efficiently, the field materials moved by the row cleaner 46 should typically be composed almost entirely of residue, such that there is little to no soil moved by the row cleaner 46. In some embodiments, the surface cleanliness parameter of the worked area WA1 may be compared to a baseline cleanliness threshold to determine if the worked area WA1 is being cleaned better than necessary (e.g., leaving more bare soil, less residue, fewer/smaller clods, etc. than required). If the worked area WA1 is being cleaned better than necessary, and the determined efficiency of the row cleaner 46 indicates that the worked area WA1 is cleaner than the unworked area UW1 (e.g., if the determined efficiency is positive), it is likely that too much soil is being moved and that the down pressure or depth setting of the row cleaner 46 needs to be adjusted (e.g., decreased). Alternatively, or additionally, in some embodiments, the field of view 122 of the row sensor(s) 120 includes at least a portion of the field material(s) MS1, MS2 moved by the row cleaner 46. In such embodiments, the row sensors 120 may generate data which may be automatically analyzed in any suitable way (e.g., by using one or more suitable image processing algorithms on images captured by the sensor(s) 120) to determine the composition (e.g., the amounts or percentages of residue and/or soil) of the field material(s) MS1, MS2 moved by the row cleaner 46. The composition of the field material(s) MS1, MS2 moved by the row cleaner 46 may be monitored based at least in part on such data from the row sensor(s) 120. If the monitored amount or percentage of residue within the field material(s) MS1, MS2 moved by the row cleaner falls below an associated residue threshold, then it may be determined that the down pressure or depth setting of the row cleaner 46 needs to be decreased. Similarly, if the monitored amount or percentage of soil within the field material(s) MS1, MS2 moved by the row cleaner exceeds an associated soil threshold, then it may be determined that the down pressure or depth setting of the row cleaner 46 needs to be decreased.

It should be appreciated that determining the efficiency of the row cleaner 46 based on the comparison of the worked and unworked areas WA1, UW1 may be performed separately or concurrently with monitoring the composition of the field material(s) MS1, MS2 moved to improve the overall performance of the row cleaner 46. For instance, in some embodiments, an aggressiveness of the row cleaner 46 may be desired to be kept within an acceptable aggressiveness range. In one embodiment, an upper end of such acceptable aggressiveness range is defined by the maximum acceptable amount of soil that is moved by the row cleaner from the worked area WA1 during operation. Similarly, in one embodiment, a lower end of such acceptable aggressiveness range is defined by the minimum acceptable amount of residue and/or clods that is moved from and/or the maximum acceptable size of clods that remain within the worked area WA1, or the minimum amount of remaining uncovered soil within the worked area WA1 during operation. In several embodiments, the determined efficiency of the row cleaner 46 may be monitored to keep the aggressiveness of the row cleaning device at or above the lower end of the acceptable aggressiveness range, while the composition of the field materials moved by the row cleaning device may be monitored to keep the aggressiveness of the row cleaning device at or below the upper end of the acceptable aggressiveness range.

Figure 4:
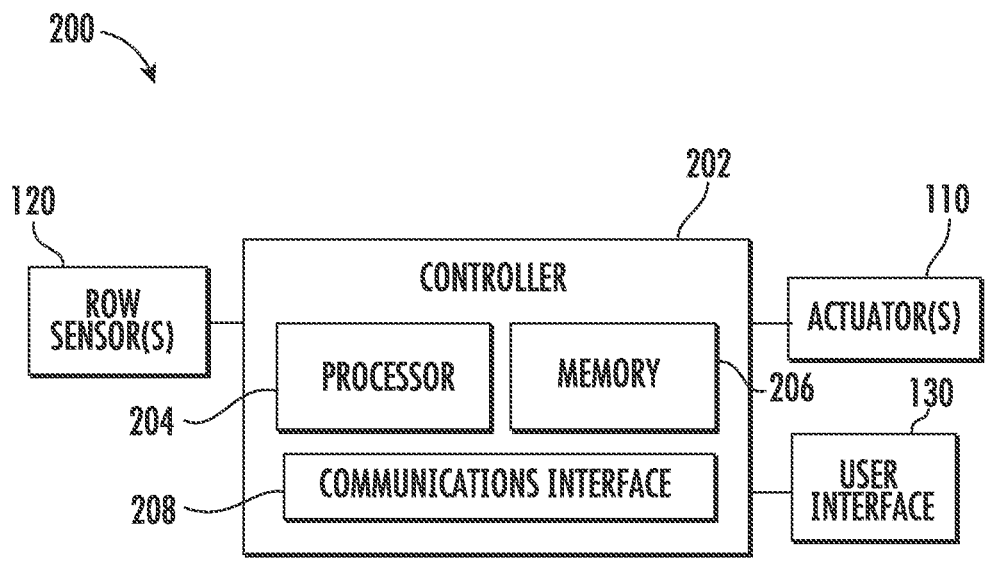
FIG. 4 illustrates a schematic view of a system for automatically controlling the operation of a row cleaning device of a seed-planting implement in accordance with aspects of the present subject matter.

Referring now to FIG. 4, a schematic view of one embodiment of a system 200 for automatically controlling the operation of a row cleaning device of a seed-planting implement is illustrated in accordance with aspects of the present subject matter. In general, the system 200 will be described herein with reference to the seed-planting implement 10 and row unit 18 described above with reference to FIGS. 1 and 2, and the example portion of the field 100 shown in FIG. 3. However, it should be appreciated by those of ordinary skill in the art that the disclosed system 200 may generally be utilized with agricultural implements having any other suitable implement configuration and/or row units having any other suitable row unit configuration.

As shown in FIG. 4, the system 200 may include a controller 202 and various other components configured to be communicatively coupled to and/or controlled by the controller 202. In general, the controller 202 may comprise any suitable processor-based device known in the art, such as a computing device or any suitable combination of computing devices. Thus, in several embodiments, the controller 202 may include one or more processor(s) 204, and associated memory device(s) 206 configured to perform a variety of computer-implemented functions.

As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 206 of the controller 202 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 206 may generally be configured to store suitable computer-readable instructions that, when implemented by the processor(s) 204, configure the controller 202 to perform various computer-implemented functions, such as one or more aspects of the methods and algorithms that will be described herein. In addition, the controller 202 may also include various other suitable components, such as a communications circuit or module, one or more input/output channels, a data/control bus and/or the like.

It should be appreciated that, in several embodiments, the controller 202 may correspond to an existing controller of the seed-planting implement 10 and/or of the work vehicle to which the implement 10 is coupled. However, it should be appreciated that, in other embodiments, the controller 202 may instead correspond to a separate processing device. For instance, in one embodiment, the controller 202 may form all or part of a separate plug-in module that may be installed within the seed-planting implement 10 to allow for the disclosed system and method to be implemented without requiring additional software to be uploaded onto existing control devices of the seed-planting implement 10.

In some embodiments, the controller 202 may be configured to include a communications module or interface 208 to allow for the controller 202 to communicate with any of the various other system components described herein. For instance, as described above, the controller 202 may, in several embodiments, be configured to receive data inputs from one or more sensors of the agricultural implement 10 that are used to detect one or more parameters associated with the amount of soil and the amount and/or size of clods within the field. Particularly, the controller 202 may be in communication with the row sensor(s) 120 via any suitable connection, such as a wired or wireless connection, to allow data indicative of the amount of soil and the amount and/or size of clods within the field to be transmitted from the row sensor(s) 120 to the controller 202. Further, the controller 202 may be configured to control the actuator(s) 110 of the row cleaner(s) 46. Additionally, in some embodiments, the controller 202 may be configured to communicate with a user interface 130 having a display device. However, it should be appreciated that the controller 202 may instead be communicatively coupled to any number of other indicators, such as lights, alarms, and/or the like.

The controller 202 may be configured to execute one or more routines for controlling the operation of the row cleaner(s) 46 based on data received from the row sensor(s) 120. For instance, as indicated above, in one embodiment, the controller 202 may be configured to process or analyze the data received from the sensor(s) 120 indicative of a surface cleanliness parameter of a worked area WA1 and an unworked area(s) UW1, UW2 of the field (e.g., as defined by the amount of residue, the amount and/or average size of clods, and/or the amount of uncovered soil within such portions of the field). The controller 202 may include any suitable data processing techniques to determine the amount of residue, the amount and/or size of clods, and/or the amount of uncovered soil within the worked area WA1 and the unworked area(s) UW1, UW2 of the field based at least in part on the data received from the sensor(s) 120. In some embodiments, for example, the controller 202 may analyze images of the worked and unworked areas WA1, UW1, UW2 using any suitable image processing techniques. Suitable processing or analyzing techniques may include performing a spatial or spectral analysis on received images or image data. For instance, geometric or spatial processing algorithms may differentiate the shape of residue from uncovered soil particles. Similarly, shape detection and/or edge-finding or perimeter-finding algorithms may be used that differentiate clods from uncovered soil and/or residue. Additionally, if the sensor(s) 120 comprises a multi-spectral camera(s), spectral processing algorithms may be used to differentiate the spectral reflectance of residue from the spectral reflectance of soil.

The controller 202 may further include processing techniques or algorithms that compare the surface cleanliness of the worked area WA1 and unworked area(s) UW1, UW2 to determine a cleanliness differential between such portions of the field, where the cleanliness differential is generally indicative of the efficiency or effectiveness of the row cleaner(s) 46. Such cleanliness differential may be based at least in part on a differential between the amounts of residue, the amounts and/or sizes of clods, and/or amounts of uncovered soil within the worked area WA1 and the unworked area(s) UW1, UW2 determined based on the data from the sensor(s) 120. The controller 202 may be configured to monitor (e.g., periodically or continuously) such efficiency during the performance of a planting operation. If the controller 202 determines that the monitored efficiency is below a predetermined efficiency threshold set for the row cleaner(s) 46, then the controller 202 may be configured to control the operation of the actuator(s) 110 of the row cleaner(s) 46 to increase the down force on or aggressiveness of the row cleaner(s) 46. In some embodiments, the controller 202 may be further configured to control the user interface 130 to display or otherwise indicate the monitored efficiency of the row cleaner(s) 46.

Further, in some embodiments, the controller 202 may include processing techniques or algorithms that compare the surface cleanliness of the worked area WA1 to a baseline cleanliness threshold. The baselines cleanliness threshold may generally be indicative of a desired or requested cleanliness of the travel path. If the surface cleanliness parameter of the worked area WA1 is better than the baseline cleanliness threshold (e.g., if the amount of uncovered soil within the worked area WA1 is greater than a baseline amount of uncovered soil, the amount of residue within the worked area WA1 is less than a baseline amount of residue, the amount and/or size of clods within the worked area WA1 is less than a baseline amount and/or size of clods, etc.), then the controller 202 may be configured to control the operation of the actuator(s) 110 of the row cleaner(s) 46 to decrease the down force on or aggressiveness of the row cleaner(s) 46. Particularly, the controller 202 may decrease the down force on or the aggressiveness of the row cleaner(s) 46 if the surface cleanliness parameter of the worked area WA1 is better than the baseline cleanliness threshold and the efficiency of the row cleaner(s) 46 is positive (e.g., subtraction of the amount of uncovered soil within the unworked area UW1 from the amount of uncovered soil within the worked area WA1 is positive, subtraction of the amount of residue within the worked area WA1 from the amount of residue within the unworked area UW1 is positive, subtraction of the amount and/or size of clods within the worked area WA1 from the amount and/or size of clods within the unworked area UW1 is positive, etc.). Alternatively, if the surface cleanliness parameter of the worked area WA1 is worse than the baseline cleanliness threshold (e.g., if the amount of uncovered soil within the worked area WA1 is less than a baseline amount of uncovered soil, the amount of residue within the worked area WA1 is greater than or equal to a baseline amount of residue, the amount and/or size of clods within the worked area WA1 is greater than or equal to a baseline amount and/or size of clods, etc.), then the controller 202 may be configured to monitor the cleanliness differential as described above.

Additionally, or alternatively, in some embodiments, the controller 202 may be configured to process or analyze the data received from the sensor(s) 120 to determine the composition of the field materials MS1, MS2 moved by the row cleaner(s) 46. As indicated above, in one embodiment, the controller 202 may be configured to process or analyze the data received from the sensor(s) 120 that is indicative of the amount of residue and/or the amount of soil within the field materials MS1, MS2 moved by the row cleaner(s) 46. For example, the controller 202 may include suitable data processing techniques to determine the amount or percentage of residue and/or the amount or percentage of soil within the field materials MS1, MS2 moved by the row cleaner(s) 46 based at least in part on the data received from the sensor(s) 120 (e.g., based on images captured by the sensor(s) 120 that allow residue/soil percentages of the field materials to be determined). The controller 202 may be configured to monitor (e.g., periodically or continuously) the composition of the field materials MS1, MS2 moved by the row cleaner(s) 46 based at least in part on such amount(s) or percentage(s). If the controller 202 determines that the monitored amount or percentage of soil within the field materials MS1, MS2 moved by the row cleaner(s) 46 is above an associated soil threshold, then the controller 202 may determine that the current setting for the row cleaner(s) 46 is too aggressive and control the operation of the actuator(s) 110 of the row cleaner(s) 46 to decrease the down force on or aggressiveness of the row cleaner(s) 46. Similarly, if the controller 202 determines that the monitored amount or percentage of residue within the field materials MS1, MS2 moved by the row cleaner(s) 46 is below an associated residue threshold, then the controller 202 may determine that the current setting for the row cleaner(s) 46 is too aggressive and control the operation of the actuator(s) 110 of the row cleaner(s) 46 to decrease the down force on or aggressiveness of the row cleaner(s) 46. In some embodiments, the controller 202 may be further configured to control the user interface 130 to display or otherwise indicate the monitored composition.

It should be appreciated that the thresholds described herein may be predetermined and stored within the memory 206 of the controller 202 or may be determined and/or provided to the controller 202 in any other suitable manner. It should further be appreciated that the data from a row sensor 120 of one row unit 18 may be used to adjust the down pressure acting on the row cleaner 46 of the same unit 46 and/or row cleaners 46 of one or more other row units 18 of the implement 10.

Figure 5:
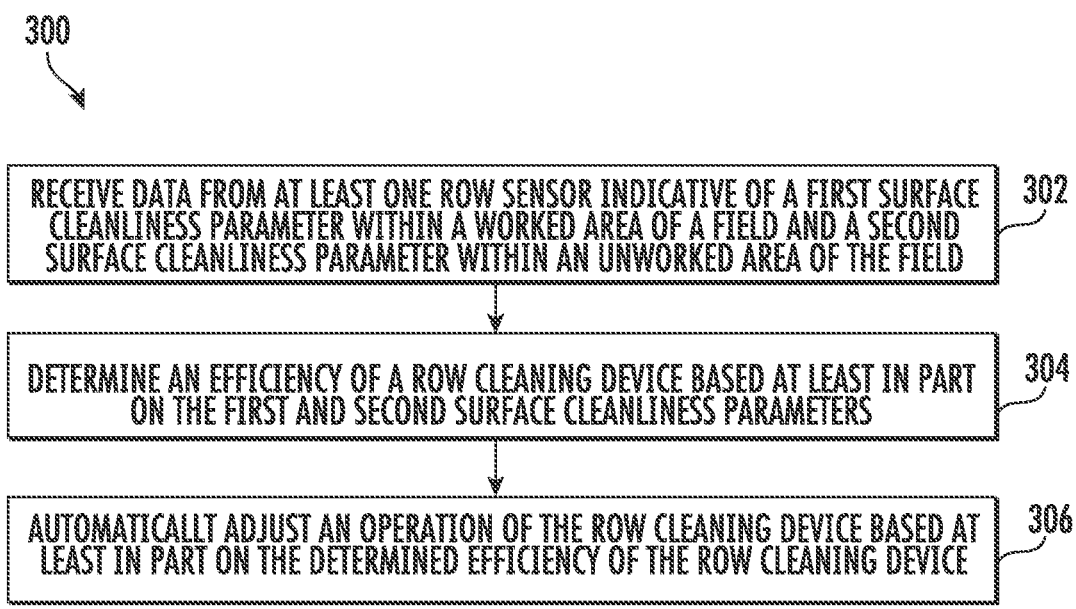
FIG. 5 illustrates a flow diagram of one embodiment of a method for automatically controlling the operation of a row cleaning device of a seed-planting implement in accordance with aspects of the present subject matter.

Referring now to FIG. 5, a flow diagram of one embodiment of a method 300 for automatically controlling the operation of a row cleaning device of a seed-planting implement is illustrated in accordance with aspects of the present subject matter. In general, the method 300 will be described herein with reference to the seed-planting implement 10 described above with reference to FIGS. 1-2, the example portion of the field shown in FIG. 3, and the system 200 described above with reference to FIG. 4. However, it should be appreciated that the disclosed method 300 may be implemented with systems having any other suitable system configuration and/or in connection with any other suitable work routes. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (302), the method 300 may include receiving data from at least one row sensor indicative of a first surface cleanliness parameter within a worked area of a field and a second surface cleanliness parameter within an unworked area of the field. For instance, as discussed above, the controller 202 may receive data from the row sensor(s) 120 indicative of both a first surface cleanliness parameter (e.g., an amount of residue, an amount and/or average size of clods, and/or an amount of uncovered soil) within the worked area WA1 located aft of and aligned with an associated row cleaner in the direction of travel of the seed planting implement and a second surface cleanliness parameter (e.g., an amount of residue, an amount and/or an average size of clods, and/or an amount of uncovered soil) within the unworked area(s) UW1, UW2 located outside the worked area WA1.

At (304), the method 300 may further include determining an efficiency of the associated row cleaning device based at least in part on the first and second surface cleanliness parameters. For example, as described above, the controller 202 may determine an efficiency of each row cleaner 46 based at least in part on the first and second surface cleanliness parameters of the worked and unworked areas WA1, UW1, UW2 associated with such row cleaner 46 (e.g., based at least in part on a differential between the first and second surface cleanliness parameters). For instance, the controller 202 may use any suitable image processing techniques on images of the worked and unworked areas WA1, UW1, UW2 from the row sensor(s) 120 to differentiate residue and/or clods from soil and/or measurements of clods within the worked and unworked areas WA1, UW1, UW2. The controller 202 may then determine corresponding cleanliness parameters based on such differentiations and/or measurements, and determine an overall efficiency based on a cleanliness differential based on such determined cleanliness parameters.

Additionally, at (306), the method 300 may include automatically adjusting an operation of the row cleaning device based at least in part on the determined efficiency of the row cleaning device. For example, as discussed above, if the determined efficiency of the row cleaner 46 is below an associated efficiency threshold set for the row cleaner 46, the controller 202 may automatically adjust the operation of the row cleaner 46 (e.g., to increase the down force acting on the row cleaner 46).

Figure 6:
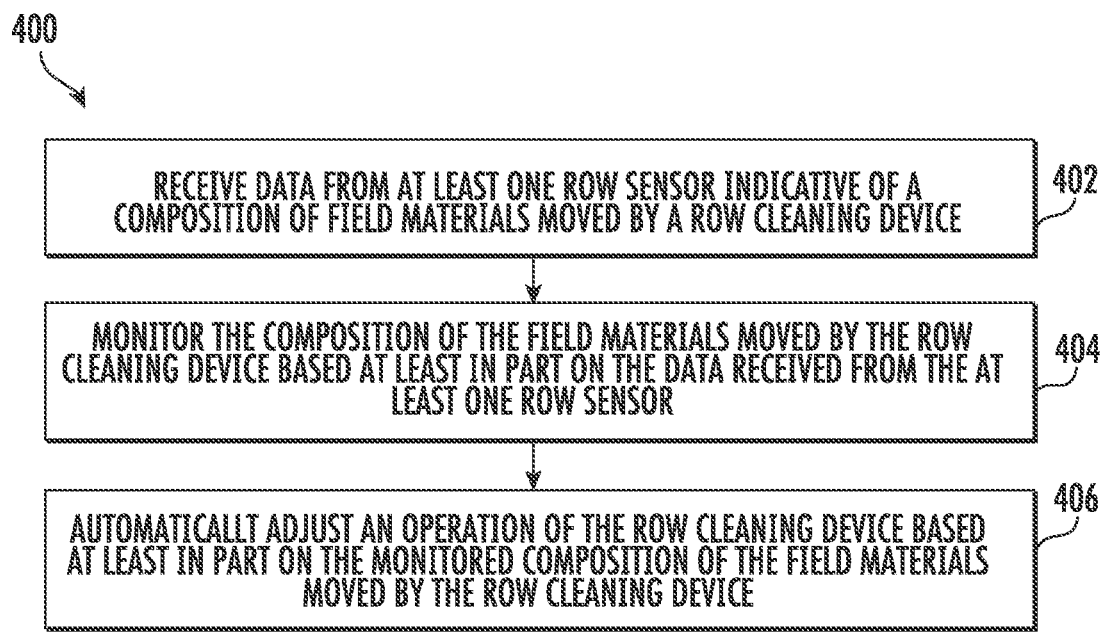
FIG. 6 illustrates a flow diagram of another embodiment of a method for automatically controlling the operation of a row cleaning device of a seed-planting implement in accordance with aspects of the present subject matter.

Referring now to FIG. 6, a flow diagram of another embodiment of a method 400 for automatically controlling the operation of a row cleaning device of a seed-planting implement is illustrated in accordance with aspects of the present subject matter. In general, the method 400 will be described herein with reference to the seed-planting implement 10 described above with reference to FIGS. 1-2, the example portion of the field shown in FIG. 3, and the system 200 described above with reference to FIG. 4. However, it should be appreciated that the disclosed method 400 may be implemented with systems having any other suitable system configuration and/or in connection with any other suitable work routes. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, at (402), the method 400 may include receiving data from at least one row sensor indicative of a composition of field materials moved by a row cleaning device. For instance, as discussed above, the controller 202 may receive data from the row sensor(s) 120 indicative of a composition (e.g., the amount or percentage of soil and/or residue) of field materials MS1, MS2 moved by the row cleaner 46.

At (404), the method 400 may further include monitoring the composition of the field materials moved by the row cleaning device based at least in part on the data received from the at least one row sensor. For instance, as described above, the controller 202 may monitor the composition (e.g., the amount or percentage of soil and/or residue) of the field materials MS1, MS2 moved by the row cleaner 46 based at least in part on the data received from the row sensor(s) 120. For example, the controller 202 may use any suitable data processing techniques on data indicative of the moved field materials MS1, MS2 from the row sensor(s) 120 to differentiate soil from residue within the moved field materials MS1, MS2 and, from the differentiation, a corresponding composition of the moved field materials MS1, MS2.

Additionally, at (406), the method 400 may include automatically adjusting an operation of the row cleaning device based at least in part on the monitored composition of the field materials moved by the row cleaning device. For example, as discussed above, if the monitored composition of the row cleaner 46 indicates that the amount or percentage of soil within the field materials MS1, MS2 is above an associated soil threshold and/or that the amount or percentage of residue within the field materials MS1, MS2 is below an associated residue threshold, the controller 202 may automatically adjust the operation of the row cleaner 46 (e.g., to increase or decrease the down force acting on the row cleaner 46).

It is to be understood that the steps of the methods 300, 400 are performed by the computing system 200 upon loading and executing software code or instructions which are tangibly stored on a tangible computer readable medium, such as on a magnetic medium, e.g., a computer hard drive, an optical medium, e.g., an optical disk, solid-state memory, e.g., flash memory, or other storage media known in the art. Thus, any of the functionality performed by the computing system 200 described herein, such as the methods 300,400, is implemented in software code or instructions which are tangibly stored on a tangible computer readable medium. The computing system 200 loads the software code or instructions via a direct interface with the computer readable medium or via a wired and/or wireless network. Upon loading and executing such software code or instructions by the computing system 200, the computing system 200 may perform any of the functionality of the computing system 200 described herein, including any steps of the methods 300, 400 described herein.

The term "software code" or "code" used herein refers to any instructions or set of instructions that influence the operation of a computer or computing system. They may exist in a computer-executable form, such as machine code, which is the set of instructions and data directly executed by a computer's central processing unit or by a computing system, a human-understandable form, such as source code, which may be compiled in order to be executed by a computer's central processing unit or by a computing system, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a computing system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for controlling the operation of a row cleaning device of a seed-planting implement, the system comprising:
   a row cleaning device configured to adjust a surface cleanliness of a portion of a field aligned with a travel path of a component of a seed-planting implement as the seed-planting implement moves across the field, the component being positioned aft of the row cleaning device along a direction of travel of the seed-planting implement;
   at least one row sensor configured to generate data indicative of a first surface cleanliness parameter within a worked area of the field positioned aft of the row cleaning device and a second surface cleanliness parameter within an unworked area of the field, the worked area of the field comprising at least a portion of the travel path of the component, the unworked area of the field being outside of the worked area of the field;
   a controller communicatively coupled to the at least one row sensor, the controller comprising a processor and a memory, the memory being configured to store instructions that, when executed by the processor, configure the controller to:
      receive the data indicative of the first and second surface cleanliness parameters from the at least one row sensor; and
      determine an efficiency of the row cleaning device based at least in part on the first and second surface cleanliness parameters.

2. The system of claim 1, wherein the controller is configured to automatically adjust an operation of the row cleaning device when the efficiency of the row cleaning device is less than an efficiency threshold for the seed-planting implement.

3. The system of claim 2, wherein the controller is configured to adjust the operation of the row cleaning device by increasing a downforce applied to the row cleaning device when the efficiency of the row cleaning device is less than the efficiency threshold.

4. The system of claim 2, wherein the controller is further configured to:
   compare the first surface cleanliness parameter to a baseline cleanliness threshold,
   wherein automatically adjusting the operation of the row cleaning device comprises automatically adjusting the operation of the row cleaning device when the first surface cleanliness parameter is worse than the baseline cleanliness threshold and when the efficiency of the row cleaning device is less than the efficiency threshold for the seed-planting implement.

5. The system of claim 1, wherein the controller is configured to:
   compare the first surface cleanliness parameter to a baseline cleanliness threshold, and
   automatically adjust, when the first surface cleanliness parameter is better than the baseline cleanliness threshold, an operation of the row cleaning device based at least in part on whether the efficiency of the row cleaning device is positive or negative, the efficiency of the row cleaning device being positive when the worked area of the field is cleaner than the unworked area of the field.

6. The system of claim 5, wherein the controller is configured to adjust the operation of the row cleaning device by decreasing a downforce applied to the row cleaning device when the efficiency of the row cleaning device is positive.

7. The system of claim 1, wherein the first surface cleanliness parameter is indicative of at least one of an amount of uncovered soil, an amount of residue, an amount of clods, or an average clod size within the worked area of the field, and the second surface cleanliness parameter is indicative of the at least one of the amount of uncovered soil, the amount of residue, the amount of clods, or the average clod size within the unworked area of the field.

8. The system of claim 1, wherein the worked area of the field extends in a lateral direction oriented perpendicular to the direction of travel between a first side of the worked area of the field and a second side of the worked area of the field, the unworked area of the field extending in the lateral direction from at least one of the first side or the second side of the worked area of the field or extending forward of the worked area of the field along the direction of travel.

9. The system of claim 1, wherein the efficiency is determined based at least in part on a differential between the first and second surface cleanliness parameters.

10. The system of claim 1, wherein the at least one row sensor comprises a camera, wherein the data received from the at least one row sensor comprises one or more images of the worked and unworked areas of the field.

11. A method for controlling the operation of a row cleaning device of a seed-planting implement, the row cleaning device being configured to adjust a surface cleanliness of a portion of a field aligned with a travel path of a component of a seed- planting implement as the seed-planting implement moves across the field, the component being aft of the row cleaning device along a direction of travel of the seed-planting implement, the method comprising:
receiving, with one or more computing devices, data from at least one row sensor as the seed planting implement moves across the field, the data being indicative of a first surface cleanliness parameter within a worked area of the field positioned aft of the row cleaning device and a second surface cleanliness parameter within an unworked area of the field, the worked area of the field comprising at least a portion of the travel path of the component, the unworked area of the field being outside of the worked area of the field;
determining, with the one or more computing devices, an efficiency of the row cleaning device based at least in part on the first and second surface cleanliness parameters; and
automatically adjusting, with the one or more computing devices, an operation of the row cleaning device based at least in part on the determined efficiency of the row cleaning device.

12. The method of claim 11, wherein automatically adjusting the operation of the row cleaning device comprises automatically adjusting the operation of the row cleaning device when the efficiency of the row cleaning device is less than an efficiency threshold for the seed-planting implement.

13. The method of claim 12, wherein adjusting the operation of the row cleaning device comprises increasing a downforce applied to the row cleaning device when the efficiency of the row cleaning device is less than the efficiency threshold.

14. The method of claim 11, wherein the first surface cleanliness parameter is indicative of at least one of an amount of uncovered soil, an amount of residue, an amount of clods, or an average clod size within the worked area of the field, and the second surface cleanliness parameter is indicative of the at least one of the amount of uncovered soil, the amount of residue, the amount of clods, or the average clod size within the unworked area of the field.

15. The method of claim 11, wherein the worked area of the field extends in a lateral direction oriented perpendicular to the direction of travel between a first side of the worked area of the field and a second side of the worked area of the field, the unworked area of the field extending in the lateral direction from at least one of the first side or the second side of the worked area of the field or extending forward of the worked area of the field along the direction of travel.

16. The method of claim 11, wherein the efficiency is determined based at least in part on a differential between the first and second surface cleanliness parameters.

17. The method of claim 11, wherein the at least one row sensor comprises a camera, wherein the data from the at least one row sensor comprises one or more images of the worked and unworked areas of the field.

18. The method of claim 11, wherein the at least one row sensor is further configured to capture data indicative of a percentage of soil within field materials moved by the row cleaning device, the field materials moved by the row cleaning device extending at least partially outside of the worked area of the field.

19. The method of claim 18, further comprising decreasing a downforce applied to the row cleaning device when the percentage of soil within the field materials moved by the row cleaning device exceeds a soil threshold.

20. The method of claim 18, wherein an acceptable aggressiveness range for an aggressiveness of the row cleaning device is defined between an upper end and a lower end, the method further comprising:
automatically adjusting the operation of the row cleaning device based at least in part on the determined efficiency of the row cleaning device to keep the aggressiveness of the row cleaning device at or above the lower end of the acceptable aggressiveness range, and
automatically adjusting the operation of the row cleaning device based at least in part on the percentage of soil within the field materials moved by the row cleaning device to keep the aggressiveness of the row cleaning device at or below the upper end of the acceptable aggressiveness range.

* * * * *